Jan. 25, 1927.
E. H. TARTRAIS
1,615,293
LIQUID FUEL INTERNAL COMBUSTION ENGINE
Filed March 7, 1924
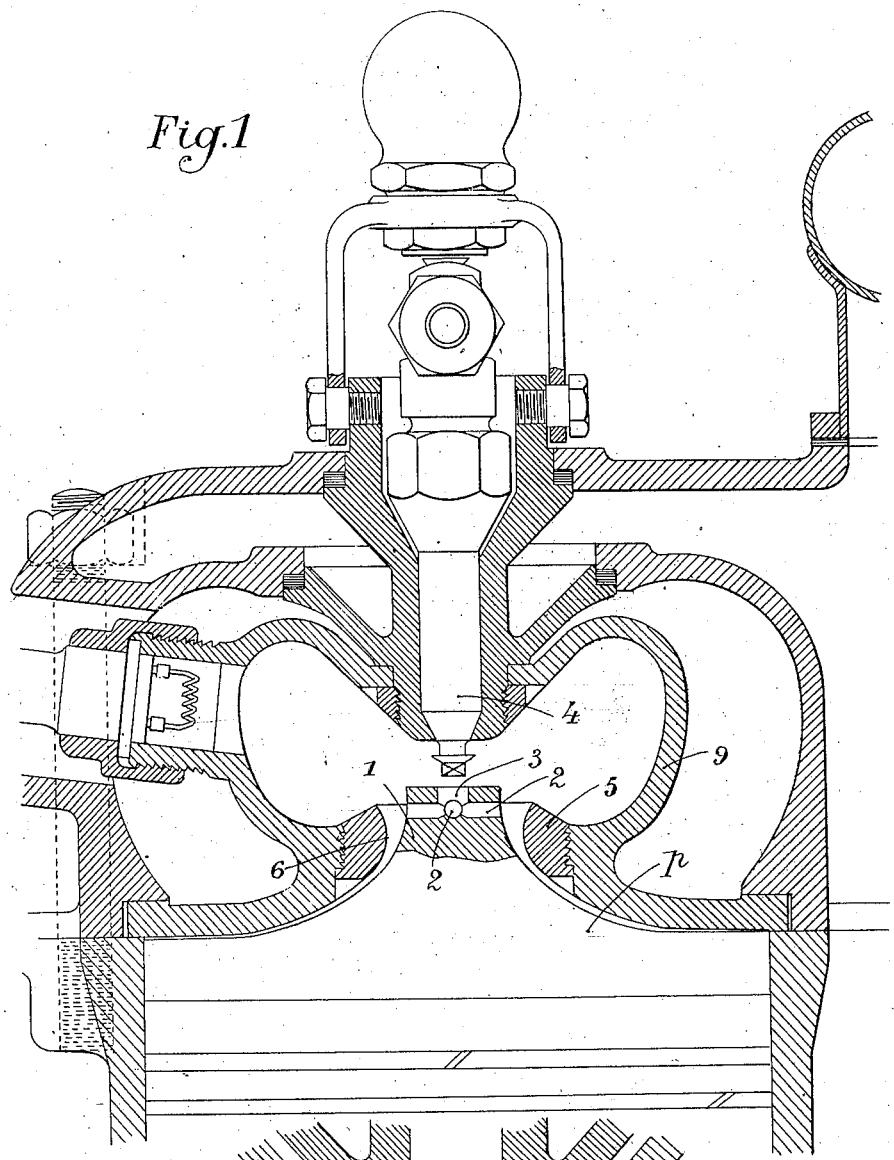
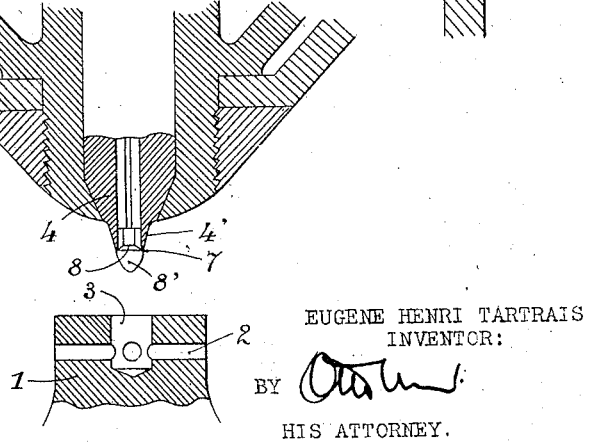
EUGENE HENRI TARTRAIS
INVENTOR:
BY
HIS ATTORNEY.

Patented Jan. 25, 1927.

UNITED STATES PATENT OFFICE.

EUGÈNE HENRI TARTRAIS, OF MAISONS-LAFFITTE, FRANCE.

LIQUID-FUEL INTERNAL-COMBUSTION ENGINE.

Application filed March 7, 1924, Serial No. 697,516, and in France March 14, 1923.

My invention relates to internal combustion engines wherein liquid fuel is injected and in which the piston is provided with a central projecting part termed deflector which, at the end of the compression stroke, enters an annular conduit or throttling conduit connecting the cylinder with the combustion chamber. The air compressed in the cylinder is thus discharged with a great velocity into the combustion chamber through the annular space between the deflector and the wall of the throttling conduit. In such engines, the liquid fuel is injected into the combustion chamber, for instance in the shape of a radial sheet, by means of an injector consisting of an automatic valve mounted in axial position in the upper wall of the combustion chamber. The insufflation of air through the annular space surrounding the deflector, in combination with the fuel injection, will produce a homogeneous fuel mixture in the combustion chamber; the whirling effect set up in the said chamber provides for the proper stirring of the fuel and air.

In engines of this class, the insufflation of air around the deflector commences before the injection of the fuel takes place. For instance for an engine having a 150 mm. stroke, if the insufflation begins at some 15 mm. before the dead centre, the injection will begin at only 5 mm. before the dead centre and will end substantially at the dead centre itself. The injection thus commences in a medium which is already in a state of agitation. Experiences proves that this is sufficient as concerns the proper mixing of the fluids. But this preliminary insufflation is found to have a great influence upon the temperature of the chamber. In fact, the air which is thus preliminarily insufflated in a violent manner is much cooler than the walls of the chamber, so that it takes up a good portion of the heat from the said walls.

In my invention, I take advantage of the said preliminary insufflation in order to obtain the automatic cleaning of the injector, and the latter is cooled at the same time. It is found that while the injector is not subject to internal fouling when in normal operation, it becomes covered, after a certain time, with a layer of carbon; this has practically no effect at full load and at high speed, but has a great effect at light loads and at slow speeds, and thus frequent cleaning is necessary. This latter drawback is obviated in the arrangement constituting the object of my invention.

In accordance with the invention, the deflector is pierced with radial holes and an axial orifice communicating with the said holes, said orifice being situated exactly opposite the injector; moreover the throttling conduit comprises a restricted portion, so that during the first period of the insufflation, a strong blast of air will impinge directly upon the injector which latter will thus be cleaned as well as cooled, the said air blast being stopped during the last period of the insufflation. Further, the injector valve has preferably an ogival head forming an extension of the conical surface of the injector body.

In the appended drawing which is given by way of example:

Fig. 1 is an axial section of the combustion chamber, the injector and the upper part of the piston provided with the central projecting part.

Fig. 2 is a detail view on a larger scale, showing an injector with an ogival head.

The deflector portion 1 of the piston $p$ is pierced with the radial holes 2 ending in a central orifice 3 which is exactly opposite the injector 4. The throttling element 5 has a flaring shape, with a restricted portion at 6. During the ascent of the piston, as long as the holes 2 remain below the restricted portion 6, a portion of the air discharged by the piston into the combustion chamber 9 can enter the deflector through the holes 2 and it issues through the orifice 3; the resulting stream of air will thus strike directly against the injector 4 whereby the latter is automatically cleaned and cooled. But when the said holes rise above the restricted part 6 during the ascent of the piston, the air ceases to flow through the holes 2, and the air blast upon the injector thus ceases. The injection may now commence.

The improved injector shown in Fig. 2 can be used to advantage with the said arrangement. The knife-edge seat 7 employed in the known types of injector is still retained, but the valve 8 does not extend outwardly of the seat and is provided with an ogival head 8′, constituting an extension of the conical surface 4′ of the main body 4 of the injector. In this manner, all the streams of air issuing from the orifice 3 of the deflector are enabled to impinge upon the surface to be cleaned.

The arrangements hereinbefore described are obviously susceptible of various constructional modifications without departing from the spirit of the invention.

Having now described my invention what I claim as new and desire to secure by Letters Patent is:

1. In a liquid fuel internal combustion engine, a cylinder, a combustion chamber, a passage affording communication between said cylinder and said combustion chamber and having a restricted part, and a bell-mouthed part following said restricted part and opening into said combustion chamber, an injector mounted opposite said passage, a piston working in said cylinder, a projecting part carried by the piston head and adapted to project through said passage, an axial conduit and radial conduits in said projecting part, said radial conduits opening laterally and into said axial conduit and being situated beyond said restricted part when the piston reaches its upper dead centre.

2. In a liquid fuel internal combustion engine, a cylinder, a combustion chamber, a passage affording communication between said cylinder and said combustion chamber and having a restricted part, and a bell-mouthed part following said restricted part and opening into said combustion chamber, an injector, said injector comprising a conical body, a valve and an ogival head carried by said valve opposite said passage and forming the prolongation of said conical body, a piston working in said cylinder, a projecting part carried by the piston head and adapted to project through said passage and openings provided through said projecting part, an axial conduit and radial conduits in said projecting part, said radial conduits opening laterally and into said axial conduit and being situated beyond said restricted part when the piston reaches its upper dead center.

In testimony whereof I have signed my name to this specification.

EUGÈNE HENRI TARTRAIS.